United States Patent
Kline

(10) Patent No.: US 7,543,272 B1
(45) Date of Patent: Jun. 2, 2009

(54) METHOD AND APPARATUS FOR FINDING TERMINAL CLASSES IN A COLLECTION OF PROGRAMMING LANGUAGE CLASSES

(75) Inventor: John A. Kline, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 674 days.

(21) Appl. No.: 11/165,808

(22) Filed: Jun. 24, 2005

Related U.S. Application Data

(60) Provisional application No. 60/582,880, filed on Jun. 25, 2004.

(51) Int. Cl.
*G06F 9/44* (2006.01)
*G06F 12/00* (2006.01)

(52) U.S. Cl. ............. 717/116; 717/108; 717/148; 717/120; 717/166; 707/206

(58) Field of Classification Search .......... 717/166, 717/148, 132, 137, 108, 120; 707/206
See application file for complete search history.

(56) References Cited

U.S. PATENT DOCUMENTS

| | | | | |
|---|---|---|---|---|
| 5,519,868 | A * | 5/1996 | Allen et al. ............ | 717/169 |
| 6,163,780 | A * | 12/2000 | Ross ..................... | 707/101 |
| 6,513,040 | B1 * | 1/2003 | Becker et al. ......... | 707/10 |
| 6,725,280 | B1 * | 4/2004 | Bracha ................. | 719/315 |
| 7,178,140 | B2 * | 2/2007 | Dmitriev .............. | 717/166 |
| 7,263,696 | B1 * | 8/2007 | Gruttadauria et al. | 717/166 |

OTHER PUBLICATIONS

IBM Technical disclosure Bulletin, Different points of view for a class browser, May 1995, vol. 38, Issue No. 5, pp. 53-56.*
Object recognition based on characteristic view classes, Wang, R.; Freeman, H., 1990, IEEE, vol. 16-21, pp. 8-12 vol. 1.*
Active and interactive learning online: a comparison of Web-based and conventional writing classes, Mehlenbacher, B.; Miller, C.R.; Covington, D.; Larsen, J.S., 2000, IEEE, vol. 43 Issue: 2, pp. 166-184.*
Liao et al. Process to identify disjoint subclasses and class life cycle information using a role analysis technique; Information and Software Technology 39; 1997, pp. 439-444.*

* cited by examiner

*Primary Examiner*—Wei Y Zhen
*Assistant Examiner*—Satish Rampuria
(74) *Attorney, Agent, or Firm*—Park, Vaughan & Fleming LLP

(57) ABSTRACT

One embodiment of the present invention provides a system that facilitates finding terminal classes in a collection of programming language classes, wherein a terminal class is a class that is not extended by any other class. The system operates by receiving a collection of classes. The system then adds the classes to a map of the collection of classes, wherein keys to each class in the map include each class' superclass and the interfaces each class directly implements. Next, the system analyzes a given class in the map of the collection of classes to determine if the given class extends any other class in the collection of classes. If so, the system removes this extended class from the collection of classes. Finally, the system repeats the steps of analyzing classes and removing extended classes until all remaining classes in the collection of classes are terminal classes.

15 Claims, 2 Drawing Sheets

METHOD AND APPARATUS FOR FINDING TERMINAL CLASSES IN A COLLECTION OF PROGRAMMING LANGUAGE CLASSES

RELATED APPLICATION

This application hereby claims priority under 35 U.S.C. §119 to U.S. Provisional Patent Application No. 60/582,880, filed on 25 Jun. 2004, entitled "One Pass Terminal Class Finder," by inventor John A. Kline, which is incorporated herein by reference.

BACKGROUND

1. Field of the Invention

The present invention relates to programming languages for computer systems. More specifically, the present invention relates to a method and an apparatus for finding terminal classes in a collection of programming language classes.

2. Related Art

Object-oriented programming languages, such as JAVA, provide a powerful framework to application developers in the form of classes. When writing applications, application developers can use the functions in the core classes, or additionally, they can extend and modify these functions by adding their own classes to the application. It is very common for enterprise applications to use a variety of classes from a variety of different parties. For example, an application that accesses a database might use a class that is provided by a database vendor to access the data in the database. Additionally, the application might use a class or collection of classes from an interface provider to implement a Graphical User Interface for the application.

However, this powerful framework is not without its problems. As the number of classes within a given application continue to grow, it can be difficult for a programmer to determine which classes to use. If the entire list of classes is presented to the user, that list may contain classes which are not meant to be used because they are further extended by other classes that provide additional desired behavior. As more and more classes are added to the application, it becomes increasingly difficult to determine which classes should be used for specific functions.

Hence, what is needed is a method and an apparatus to facilitate locating desired classes without the problems listed above.

SUMMARY

One embodiment of the present invention provides a system that facilitates finding terminal classes in a collection of programming language classes, wherein a terminal class is a class that is not extended by any other class. The system operates by receiving a collection of classes. The system then adds the classes to a map of the collection of classes, wherein keys to each class in the map include each class' superclass and the interfaces each class directly implements. Next, the system analyzes a given class in the map of the collection of classes to determine if the given class extends any other class in the collection of classes. If so, the system removes this extended class from the collection of classes. Finally, the system repeats the steps of analyzing classes and removing extended classes until all remaining classes in the collection of classes are terminal classes.

In a variation on this embodiment, the system removes the given class if it does not implement a specified interface.

In a variation on this embodiment, the system removes the given class if it is not a driver class.

In a variation on this embodiment, receiving a collection of classes further involves receiving a Java™ JAR file.

In a variation on this embodiment, the system creates a hierarchical representation of the collection of classes.

In a variation on this embodiment, the system analyzes the given class by loading the given class with a Java™ class loader.

In a variation on this embodiment, the system finds all terminal classes in the collection of classes with only a single pass through the collection of classes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

Java Virtual Machine™

Figure 1:
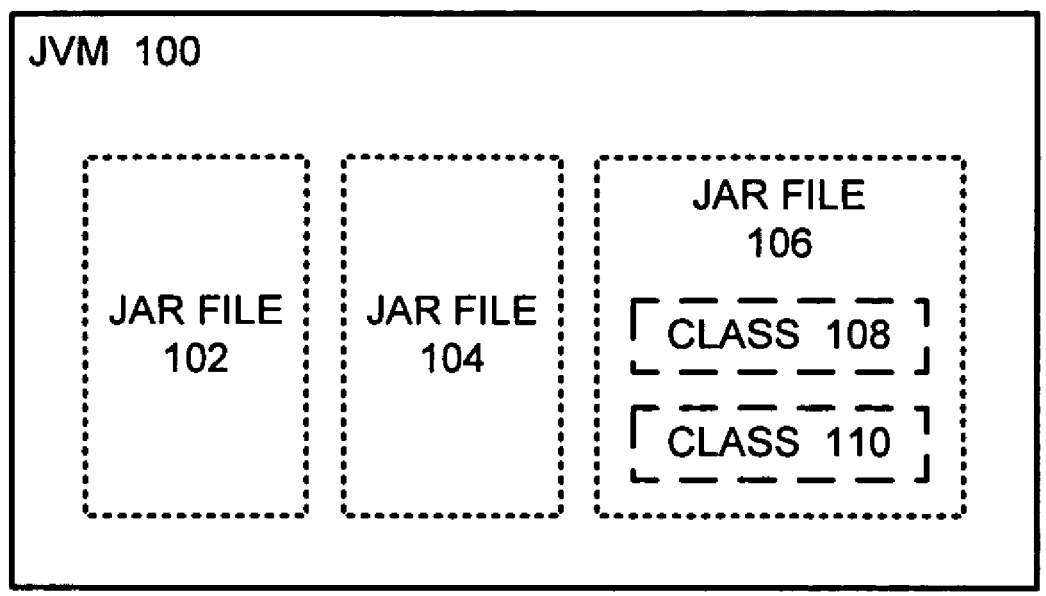
FIG. 1 illustrates a Java Virtual Machine™ in accordance with an embodiment of the present invention.

FIG. 1 illustrates a Java Virtual Machine™ (JVM) 100 in accordance with an embodiment of the present invention. The terms JAVA, JVM and JAVA VIRTUAL MACHINE are trademarks of SUN Microsystems, Inc. of Santa Clara, Calif. JVM 100 can contain JAVA™ ARchive (JAR), such as JAR files 102-106. In addition, JAR files can contain classes. For example, JAR file 106 contains class 108 and class 110.

Finding Terminal Classes

Figure 2:
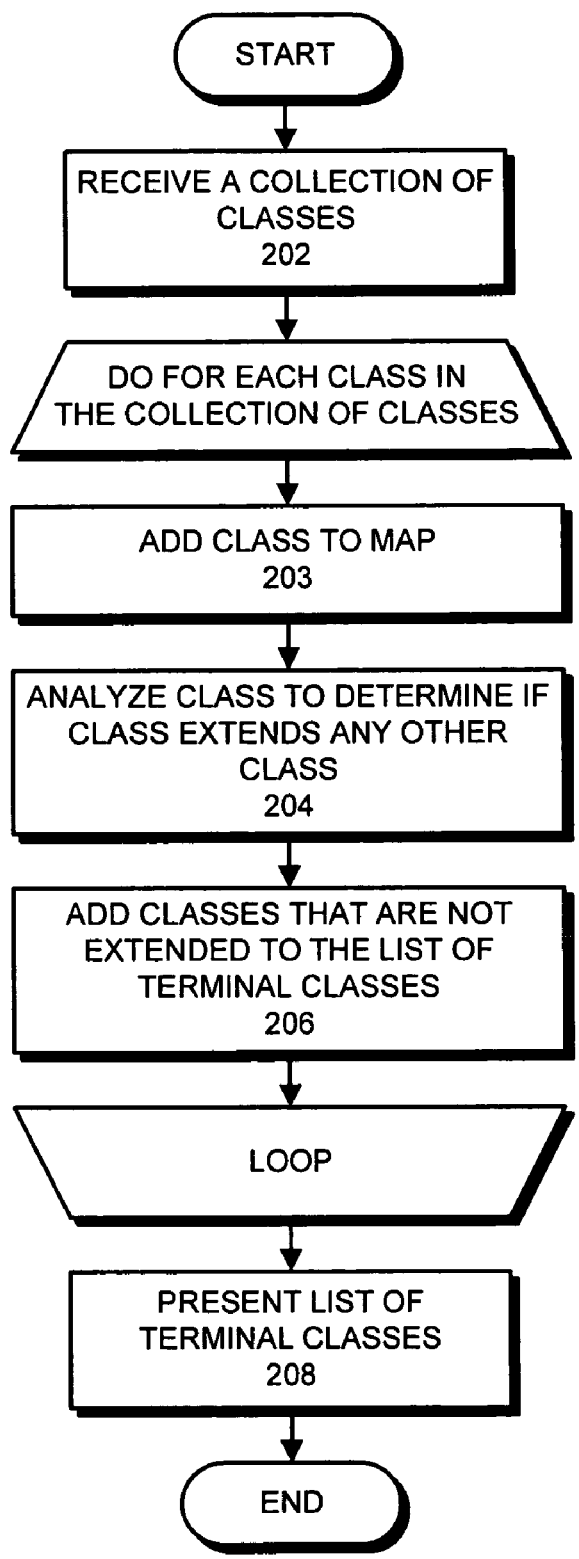
FIG. 2 presents a flowchart illustrating the process of finding terminal classes in accordance with an embodiment of the present invention.

FIG. 2 presents a flowchart illustrating the process of finding terminal classes in accordance with an embodiment of the present invention. The system starts by receiving a collection of classes (step 202). Note that this could include receiving a JAR file or a collection of JAR files, or even a simple list of classes. Also note that the present invention is not meant to be limited to the JAVA programming language.

For each class in the collection of classes, add or update entries in a map where the key(s) for each entry in the map are the class' superclass and each interface that it directly implements (step 203). After which, the jar file(s) does not need to be accessed again. Next, a given interesting interface or class is looked up in the map and all classes that implement/extend the interface/class are retrieved. These new classes are then recursively lookup up (step 204). During this recursion, any classes that do not contain an entry in the map will be terminal classes and are added to the list of terminal classes (step 206). At this point, the system can optionally present the list of terminal classes to a user (step 208).

Note that it is possible to also remove any class that does not implement a specific interface to further narrow the space requirements for the map.

One embodiment of the present invention provides an efficient process for finding a list of terminal classes in a given set of Java™ JAR files that implement a given interface. Note that a terminal class is defined as class that is not extended by any other class in the set of JAR files.

One example where this is useful is in a Java application that allows a user to configure database access. Typically, the application will have one or more JAR files that provide database access to a specific vendor's database. In the set of JARs provided, it is necessary to find a specific class or specific classes that are capable of providing that access (because they implement a specific interface). However, if the entire list of classes is presented to the user, it may contain classes not meant to be used because they are further extended by other classes that provide additional desired behavior.

The process presented by one embodiment of the present invention asserts that is it more desirable to present only the terminal classes as candidates to provide the behavior of a given interface, because those classes are the most likely to be the classes the author(s) of the JAR file(s) meant to be used.

Embodiments of a one-pass class finder described herein provide efficient ways to find classes in a collection of JAR files that implement an interface (directly or indirectly via a parent class) and make an educated guess as to what classes can be pruned from this list. The one-pass class finder takes only a single pass through the collection of JARs presented and prunes any classes that are extended by other classes.

In doing so, the one-pass class finder finds a potentially shorter list of classes that fulfill a user's needs in an efficient manner. The one-pass class finder may be used to suggest terminal classes when an end user is adding functionality to a computer program by adding new JAR file(s) and specifying a class in those JAR file(s) that implements the interface required by the program.

In one embodiment of the present invention, a one-pass class finder generates a list of terminal classes in a set of JAR files that (directly or indirectly) implement a given interface G. The method involves constructing an empty map M and making a single pass through the JAR files. For each class C which is encountered during this process, if the given interface is assignable from the class, the method further involves:

I. finding the superclass,

II. finding the set of interfaces directly implemented by C, and

III. for each superclass S (except for java.lang.Object) and each interface I found in I. and II. above:
  a. looking up the name of S or the name of I in M, and:
    i. if it does not exist, creating a map entry with the name of S or the name of I as the key, and with a set with a single entry of the name of C as the value, or
    ii. if the entry exists, adding the name of C to the set which is the value of the entry.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for finding terminal classes in a collection of programming language classes, wherein a terminal class is a class that is not extended by any other class, the method comprising:
  receiving a collection of classes;
  adding the classes to a map of the collection of classes, wherein keys to each class in the map include each class' superclass and the interfaces each class directly implements;
  finding all terminal classes in the collection of classes with only a single pass through the collection of classes by:
    analyzing a given class in the map to determine if the given class extends any other class in the collection of classes;
    if the given class extends any other class, removing this extended class from the collection of classes;
    repeating the steps of analyzing classes and removing extended classes until all remaining classes in the collection of classes are terminal classes; and
  automatically creating a hierarchical representation of the collection of classes.

2. The method of claim 1, further comprising removing the given class if it does not implement a specified interface.

3. The method of claim 1, further comprising removing the given class if it is not a driver class.

4. The method of claim 1, wherein receiving a collection of classes further involves receiving a JAR file.

5. The method of claim 1, further comprising analyzing the given class by loading the given class with a class loader.

6. A computer-readable storage medium storing instructions that when executed by a computer cause the computer to perform a method for finding terminal classes in a collection of programming language classes, wherein a terminal class is a class that is not extended by any other class, the method comprising:
  receiving a collection of classes;
  adding the classes to a map of the collection of classes, wherein keys to each class in the map include the class' superclass and the interfaces each class directly implements;
  finding all terminal classes in the collection of classes with only a single pass through the collection of classes by:
    analyzing a given class in the map to determine if the given class extends any other class in the collection of classes;
    if the given class extends any other class, removing this extended class from the collection of classes;
    repeating the steps of analyzing classes and removing extended classes until all remaining classes in the collection of classes are terminal classes; and
  automatically creating a hierarchical representation of the collection of classes.

7. The computer-readable storage medium of claim 6, wherein the method further comprises removing the given class if it does not implement a specified interface.

8. The computer-readable storage medium of claim 6, wherein the method further comprises removing the given class if it is not a driver class.

9. The computer-readable storage medium of claim 6, wherein receiving a collection of classes further involves receiving a JAR file.

10. The computer-readable storage medium of claim 6, wherein the method further comprises analyzing the given class by loading the given class with a class loader.

11. An apparatus for finding terminal classes in a collection of programming language classes, wherein a terminal class is a class that is not extended by any other class, comprising:
  a computer system including:
  a processor coupled to a memory;
  a receiving mechanism configured to receive a collection of classes;
  an analysis mechanism and a removal mechanism configured to find all terminal classes in the collection of classes with only a single pass through the collection of classes, wherein:
    the analysis mechanism configured to analyze a given class in the collection of classes to determine if the given class extends any other class in the collection of classes;
    the removal mechanism configured to remove the extended class from the collection of classes if the given class extends any other class; and
    wherein the analysis mechanism and the removal mechanism are further configured to repeat the process for all remaining classes in the collection of classes; and
  a modeling mechanism configured to automatically create a hierarchical representation of the collection of classes.

12. The apparatus of claim 11, wherein the removal mechanism is further configured to remove the given class if it does not implement a specified interface.

13. The apparatus of claim 11, wherein the removal mechanism is further configured to remove the given class if it is not a driver class.

14. The apparatus of claim 11, wherein the receiving mechanism is further configured to receive a JAR file.

15. The apparatus of claim 11, wherein the analysis mechanism is part of a class loader.

* * * * *